US005480063A

United States Patent [19]
Keyes et al.

[11] Patent Number: 5,480,063
[45] Date of Patent: Jan. 2, 1996

[54] VOLUMETRIC FLUID DISPENSING APPARATUS

[76] Inventors: Denis E. Keyes, P.O. Box 507, Rocky Hill, N.J. 08553-0507; John R. Randall, Jr., 72 Stratford Dr., Freehold, N.J. 07728; James V. Curcio, 113 New York Ave., South Plainfield, N.J. 07080

[21] Appl. No.: 225,803

[22] Filed: Apr. 11, 1994

Related U.S. Application Data

[63] Continuation-in-part of Ser. No. 26,878, Mar. 5, 1993, abandoned.

[51] Int. Cl.⁶ ............................................. B67D 5/08
[52] U.S. Cl. ........................ 222/64; 222/318; 137/563
[58] Field of Search ............................ 222/64, 318, 424, 222/67; 141/198; 137/391, 558, 563, 396

[56]  References Cited

U.S. PATENT DOCUMENTS

| | | | |
|---|---|---|---|
| 2,860,785 | 11/1958 | Gardner | 137/563 |
| 3,416,547 | 12/1968 | Glenn, Jr. et al. | 137/391 |
| 3,583,437 | 6/1971 | Mastroianni | 137/558 |
| 3,903,939 | 9/1975 | Pickett | 141/198 |
| 4,116,128 | 9/1978 | Lehmann et al. | 222/67 |
| 4,244,365 | 1/1981 | McGill et al. | 128/214 E |
| 4,654,535 | 3/1987 | Wolske | 250/577 |
| 4,967,592 | 11/1990 | Lagergren et al. | 73/49.2 |
| 5,090,594 | 2/1992 | Randall, Jr. et al. | 222/64 |
| 5,203,367 | 4/1993 | Akai et al. | 137/563 |
| 5,207,251 | 5/1993 | Cooks | 137/396 |

Primary Examiner—Andres Kashnikow
Assistant Examiner—Lisa Douglas

[57] ABSTRACT

A fluid dispensing apparatus includes a fluid chamber and a fill tube which forms a closed loop with the fluid chamber. A pair of level sensors are disposed adjacent to the fill tube. Fluid is directed from the fluid chamber into the fill tube through a fill valve. When the fluid level in the fill tube rises to a first predetermined level, the fill valve is closed and a discharge valve is opened to dispense the contents of the fill tube into a container. When the level of the fluid in the fill tube drops to a second predetermined level, the discharge valve is closed and the cycle is repeated.

8 Claims, 5 Drawing Sheets

VOLUMETRIC FLUID DISPENSING APPARATUS

This is a continuation-in-part of U.S. application Ser. No. 08/026,878 filed on Mar. 5 1993, now abandoned entitled A Volumetric Fluid Dispensing Apparatus.

BACKGROUND OF THE INVENTION

The present invention relates generally to fluid dispensing apparatuses, and more particularly to a volumetric, pistonless fluid dispensing apparatus having no moving parts in contact with the fluid.

Numerous types of fluid dispensing apparatuses exist for filling bottles. One type of fluid dispensing apparatus which is in widespread use is positive displacement fillers. Positive displacement fillers typically include moving parts which contact and displace the fluid being dispensed. For example, one type of positive displacement filler uses a piston and cylinder arrangement. In this type of positive displacement filler, the backward movement of the piston draws fluid into the cylinder through an inlet pod, and the forward movement of the piston expels the fluid through an outlet port. Another type of positive displacement filler uses a rotary pump to move the fluid.

Positive displacement pumps have gained widespread use in the United States for two reasons. First, positive displacement pumps can operate at relatively high speeds, filling as many as six hundred bottles per minute. Additionally, positive displacement pumps are accurate up to about ±0.5%. However, there are distinct disadvantages associated with positive displacement pumps.

One disadvantage with positive displacement fillers is that the fluid comes into contact with moving pads. As the moving pads wear, particulate matter enters the fluid causing particulate contamination. If severe enough, particulate contamination can render the product unusable.

Another important disadvantage with positive displacement fillers involves the difficulty in cleaning and sterilizing the moving parts in contact with the fluid. In positive displacement pumps, the critical tolerances between parts, such as the piston and cylinder, precludes effective cleaning in place. Thus, the user must disassemble the apparatus for cleaning and sterilization. This process is not only time consuming, but may result in biological contamination of the parts when they are handled by the mechanic during reassembly.

Another type of fluid dispensing apparatus is the time/pressure filler. Generally speaking, the time/pressure filler includes a fluid chamber which is maintained under a relatively constant pressure. The fluid is dispensed from the chamber through a compressible line. Fluid flow is shut off by a pinch type valve which squeezes and collapses the discharge line. A pre-determined volume of fluid is dispensed by opening the discharge line for a pre-determined period of time and then closing the line. If the pressure within the fluid chamber is maintained constant, an equal amount of fluid should be dispensed each time the cycle is repeated. However, time/pressure fillers do not work as well in practice as they do in theory.

The primary difficulty with the time/pressure filling apparatuses is that the tubing is deformed to shut off fluid flow and does not always return to its undeformed state immediately, particularly when the apparatus has been sitting idle for a long period of time. Thus, the critical orifice through which the fluid is dispensed may vary somewhat from the fully open line. The variance in the critical orifice will cause the fluid flow through the discharge line to vary until the discharge line returns to its undeformed condition. As a result, time/pressure fillers will be less accurate during the first few filling cycles.

A third type of fluid dispensing apparatus is shown in U.S. Pat. No. 5,090,594 which discloses a volummetric fluid dispensing apparatus. The volummetric dispensing apparatus comprises a measuring cup having an open top disposed within a fluid chamber. The measuring cup has a known volume. Fluid is trapped in the measuring cup by first filling the fluid chamber to a level above the open top of the measuring cup and then draining the fluid chamber until the fluid level drops below the top of the measuring cup. As the fluid in the chamber recedes, a pre-measured quantity of fluid is trapped in the measuring cup. A discharge line in fluid communication with the measuring cup is then opened to dispense the fluid into a waiting receptacle.

Volummetric fluid dispensers, while slower than positive displacement fillers, are highly accurate and avoid the problems of microbial and particulate contamination often associated with positive displacement fillers. However, the accuracy of volummetric fluid dispensers decrease at extremely small volumes. Most of the error can be attributed to the formation of the meniscus at the open top of the measuring cup. Obviously, a flat meniscus will yield a lower fill volume, and a fuller meniscus would yield a larger fill volume. The formation of the meniscus is a function of both the specific gravity of the fluid being dispensed and the pressure within the fluid chamber. These factors may vary from one application to another. Also, at extremely small fill volumes, there is sometimes a problem with air being entrapped in the measuring cup by fluid flowing over the top of the measuring cup. Air bubble formation can also lead to error.

SUMMARY AND OBJECTS OF THE INVENTION

The present invention is a fluid-dispensing apparatus having no moving parts in contact with the fluid being dispensed. The fluid-dispensing apparatus includes a fluid chamber containing the fluid to be dispensed and a fill tube communicatively connected to the fluid chamber. The fill tube forms a closed circuit with the fluid reservoir thereby eliminating the need for venting systems. A fill valve controls the flow of fluid from the fluid reservoir into the fill tube. A discharge valve dispenses fluid from the fill tube into a container. The fill valve and the discharge valve are controlled by a programmable controller which is operatively connected to a pair of level sensors. The level sensors detect the level of fluid in the fill tube.

In operation, fluid is transferred from the fluid reservoir into the fill tube by opening the fill valve. When the fluid level in the fill tube reaches a first predetermined height, the fill valve is closed and the discharge valve is closed to dispense the fluid into a container. When the fluid level in the fill tube drops to a second predetermined level, the discharge valve is closed and the cycle is repeated.

In a second mode of operation, the height of the meniscus is continuously monitored while the fluid is being dispensed. The volume of the fluid dispensed is calculated based on the measured height of the meniscus. When the calculated volume is equal to the predetermined fill volume, the flow of fluid is stopped and the process is repeated.

If a high degree of accuracy is required, the dispense cycle can be broken up into two or more steps. During the first step, approximately 95% of the total fill volume is dispensed. The volume dispensed is determined as described above by continuously monitoring the height of the meniscus in the measuring cup. When approximately 95% of the total fill volume has been dispensed, the fluid flow from the measuring cup is stopped. The height of the meniscus is then measured again to determine the amount of deviation from the 95% reference. The controller then calculates the volume, that when added to the amount already dispensed, equals the total fill volume. This method has the advantage of compensating for any errors which occur during the dispensing of the first 95%. Any error in the total fill volume can therefore be attributed to the final 5% which makes the total error very small.

Because there are no moving parts in contact with the fluid, the fluid dispensing apparatus of the present invention virtually eliminates the risk of particulate contamination of the fluid. Additionally, the fluid dispensing apparatus can be cleaned and sterilized in place since there are no moving parts to be removed. The fluid dispensing apparatus achieves these advantages over positive displacement pumps without sacrificing accuracy. Since the present invention employs volummetric principles to measure the quantity of fluid dispensed, it can achieve the same degree of accuracy as positive displacement fillers.

Based on the foregoing, it is a primary object of the present invention to provide a fluid dispensing apparatus in which no moving parts contact the fluid being dispensed.

Another object of the present invention is to provide a fluid dispensing apparatus which is sanitary in design and can be cleaned and sterilized in place.

Another object of the present invention is to provide a fluid dispensing apparatus which avoids the problems of microbial and particulate contamination.

Yet another object of the present invention is to provide a fluid dispensing apparatus which can accurately fill bottles and other receptacles to within ±0.5% of the fill volume.

Another object of the present invention is to provide a fluid dispensing apparatus which is capable of filling bottles having volumes in the range of 0.1 cc to 1.0 l.

Still another object of the present invention is to provide a fluid dispensing apparatus capable of filling up to 300 bottles per minute.

Another object of the present invention is to provide a fluid dispensing apparatus which is simple in construction and reliable in operation.

Other objects and advantages of the present invention will become apparent and obvious from a study of the following description and the accompanying drawings which are merely illustrative of such invention.

DETAILED DESCRIPTION OF THE INVENTION

Figure 1:
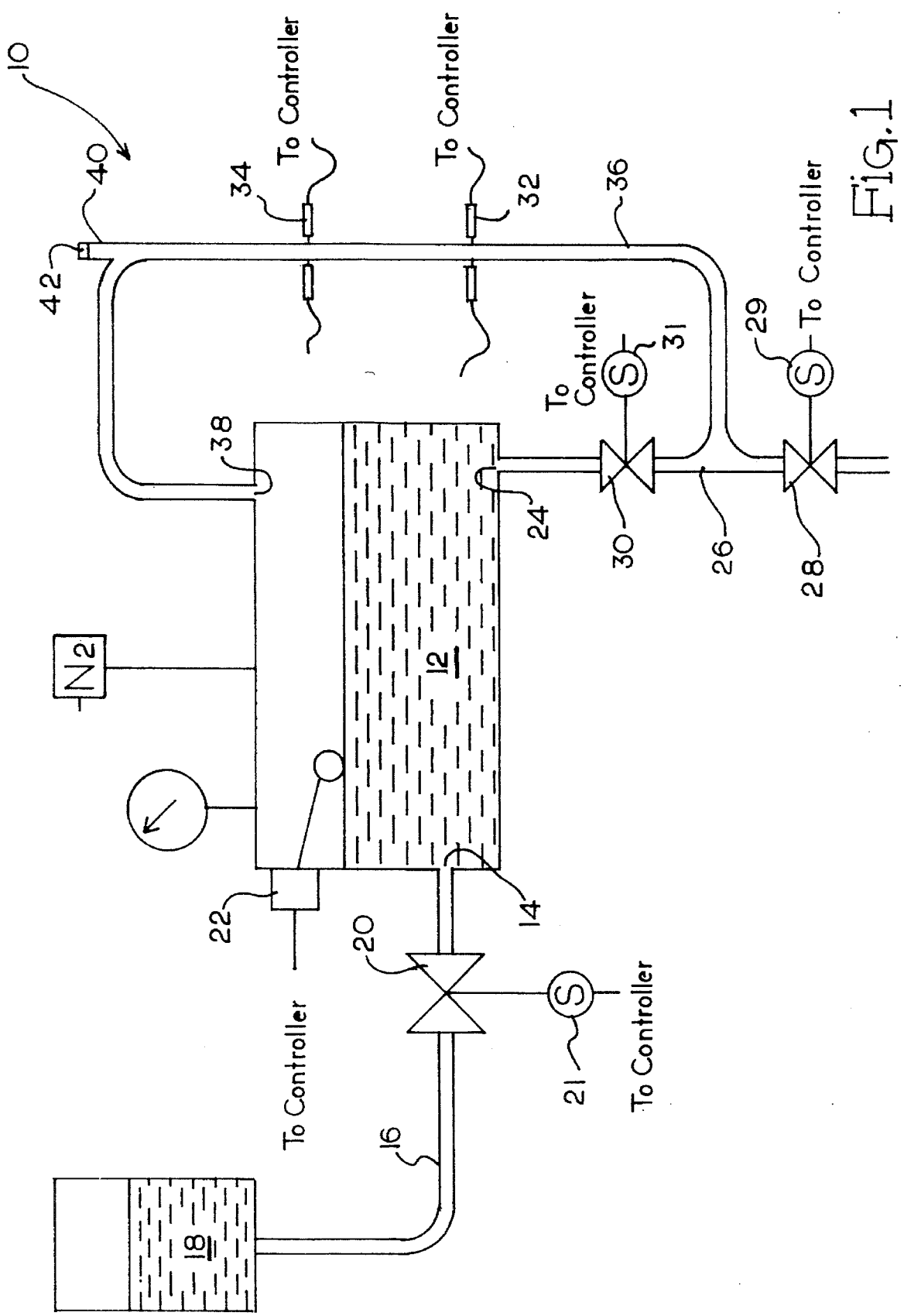
FIG. 1 is a schematic diagram illustrating the fluid-dispensing apparatus of the present invention.

Referring now to the drawings, and more particularly to FIG. 1, the dispensing apparatus of the present invention is shown therein and indicated generally by the numeral 10. The dispensing apparatus 10 includes a fluid chamber 12 having a fill port 14 which is connected by a fluid supply line 16 to a fluid source 18. The fluid chamber 12 is a closed tank which is not vented. The fill chamber 12 is charged with an inert gas, such as nitrogen. An inert gas is used to prevent reaction with the liquid being dispensed. The fluid chamber 12 is charged to a pressure of approximately 0 to 5 psi. The fluid supply line 16 includes a supply valve 20 which is activated by solenoid 21. A level control 22 monitors the level of fluid in the chamber 12. A programmable controller (not shown) is operatively connected to the level control 22 and solenoid 21. When the fluid level in the fluid chamber 12 drops below a predetermined level, the programmable controller opens supply valve 20 to introduce more fluid into the fluid chamber 12.

The fluid chamber includes a drain port 24 which is connected to a fill tube 36. Fill tube 36 forms a closed circuit with the fluid chamber 12 eliminating the need for external vents. The fill tube 36 is connected at one end to the drain port 24 in a lower portion of the fluid chamber 12. The opposite end of the fill tube 36 connects to a vent 38 in the upper portion of the fluid chamber 12. Thus, the fill tube 36 forms a closed loop with the fluid chamber 12. A fill valve 30 is disposed in the closed loop for controlling the flow of fluid from the fill chamber 12 to the fill tube 36. The fill valve 30 is controlled by solenoid 31 which is connected to the programmable controller.

A drain line 26 connects to the fill tube 36 for dispensing fluid from the fill tube 36 into a container. Drain line 26 includes a drain valve 28 for dispensing fluid as will be hereinafter described. The drain valve 28 is controlled by a solenoid 29 which is activated by the programmable controller.

A pair of optical-level sensors 32 and 34 are disposed along the fill tube 36. Both sensors 32 and 34 must be disposed below the level of the fluid in the fluid chamber 12. The upper level sensor 34 defines an upper level of fluid in the fill tube 36. The lower-level sensor 32 defines a lower level of fluid. The volume of fluid dispensed is determined by the distance between the upper and lower level sensors 32 and 34, the diameter of the fill tube 36, and the $N_2$ pressure. Both sensors 32 and 34 are connected to the programmable controller.

A meniscus sensor 42 may be included in addition to or in place of level sensors 32 and 34. If a meniscus sensor 42 is used, it is located in a tube extension 40 in the fill-tube loop. The meniscus sensor 42 is a laser-type sensor which measures the height of the meniscus in the filled tube 36. The output of the meniscus sensor 42 is transmitted to the programmable controller which uses the information to improve the accuracy of the fill volume.

Figure 2A:
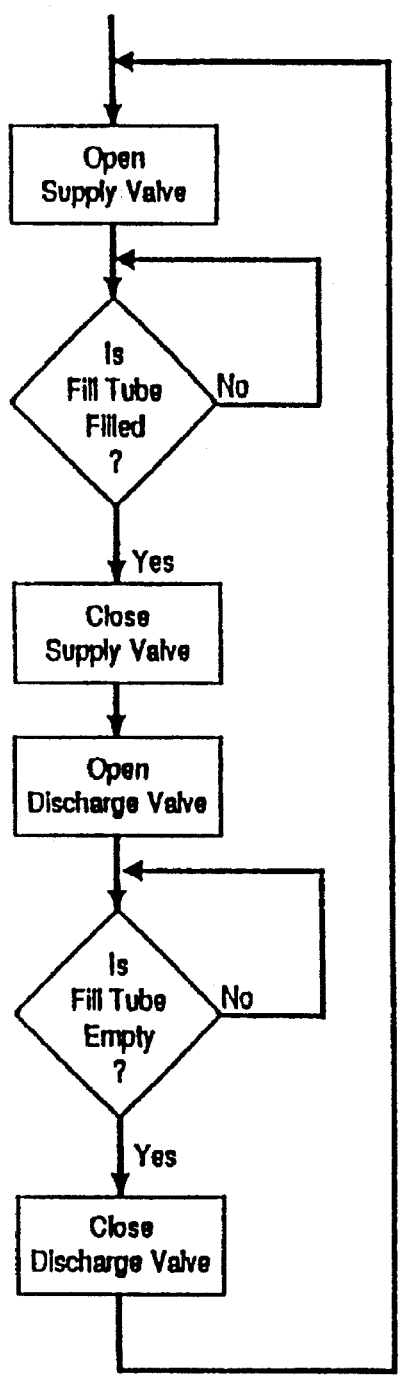
FIG. 2a is a flow diagram illustrating the mode of operation of the fluid-dispensing apparatus during a dispense cycle.

The programmable controller controls the operation of the fluid dispensing apparatus 10 as shown in FIG. 2A. The dispensing cycle includes a filling stage during which the fill tube 36 is filled with fluid, and a dispense stage in which the fluid is dispensed into a container. At the start of a filling stage, the fluid level in the fill tube 36 is at the level of the first optical sensor 32. Drain valve 28 is closed and fill valve 30 is open so that fluid from the fluid chamber 12 flows into the fill tube 36. The fluid rises in the fill tube 36 until it reaches the level of the second optical sensor 34. Once the fluid reaches this level, the programmable controller closes the fill valve 30 and opens the drain valve 28. This marks the end of the filling stage and the beginning of the dispense stage. The fluid in the fill tube 36 then drains through the drain line 26 into a container. The fluid recedes in the fill tube 36 until it reaches the level of the first optical sensor 32 at which time the drain valve 28 closes and the cycle repeats.

During the dispensing stage of the cycle, variations in the height of the meniscus may cause some deviation in the volume of fluid dispensed. The meniscus sensor 42 may be used to reject out-of-range fill volumes or to compensate for variations in the height of the meniscus. At the beginning of the dispense stage of the cycle, the height of the meniscus in the fill tube 36 is measured by sensor 42 and stored in the programmable controller's memory. Discharge valve 28 opens until the fluid drops to the level of sensor 32. When the sensor 32 detects the receding meniscus, the discharge valve 28 is closed completing the dispensing cycle. After the discharge valve closes, the final position of the meniscus is determined by the sensor 42 allowing the programmable controller to calculate the actual volume dispensed. By calculating the actual volume dispensed, out-of-range fill volumes can be rejected on line as they occur.

By knowing the height of the upper meniscus before the dispense stage of the cycle begins, the programmable controller can also delay the closing of the drain valve 28 after sensor 32 sees the receding meniscus if a smaller than normal upper meniscus has been detected. This will compensate for an otherwise, lower than normal fill volume. By measuring the position of the meniscus at the beginning of the dispense stage and then determining how long it takes to reach the position of sensor 32, a delay can be calculated by the controller which will enable drain valve 28 to remain open an additional amount of time need to yield the correct fill volume.

The meniscus sensor 42 can also be used to replace the lower sensor 32. FIGS. 2B and 2C show alternate modes of operation during the dispensing stage which eliminate the need for level sensor 32. Referring now to FIG. 2B, the dispense stage begins by measuring the height of the meniscus in the fill tube 36 and opening the discharge valve 28. While fluid is being dispensed, the controller 78 continuously monitors the height of the meniscus in a manner similar to Doplar radar as it recedes and calculates the volume of fluid dispensed. When the calculated value of the fluid dispensed equals a predetermined fill volume, which is set by the user, the discharge valve 28 is closed. The dispensing cycle will then be repeated indefinitely until the apparatus is turned off.

In a third mode of operation, shown in FIG. 2C, a first predetermined volume (V) is dispensed which is equal to approximately 95% of the desired fill volume. After the first predetermined volume ($V_1$) is dispensed, the controller calculates the amount actually dispensed based on the position of the meniscus and determines the remaining volume ($V_R$) needed to equal the total fill volume. The discharge valve 28 is reopened to dispense the remaining volume ($VF_R$) which is approximately 5% of the total fill volume. While dispensing the remaining 5%, the height of the meniscus is continuously measured and the volume dispensed ($V_2$) is calculated. With the amount dispensed ($V_2$) equals the remaining volume calculated by the controller, the discharge valve 28 is closed. Alternately, the remaining 5% could be dispensed by opening the discharge valve 28 for a predetermined time period which is calculated by the controller based on the pressure in the fluid chamber 12 and the specific gravity of the fluid. This alternate method for dispensing the remaining 5% is shown by dotted lines in FIG. 2C.

Figure 3:
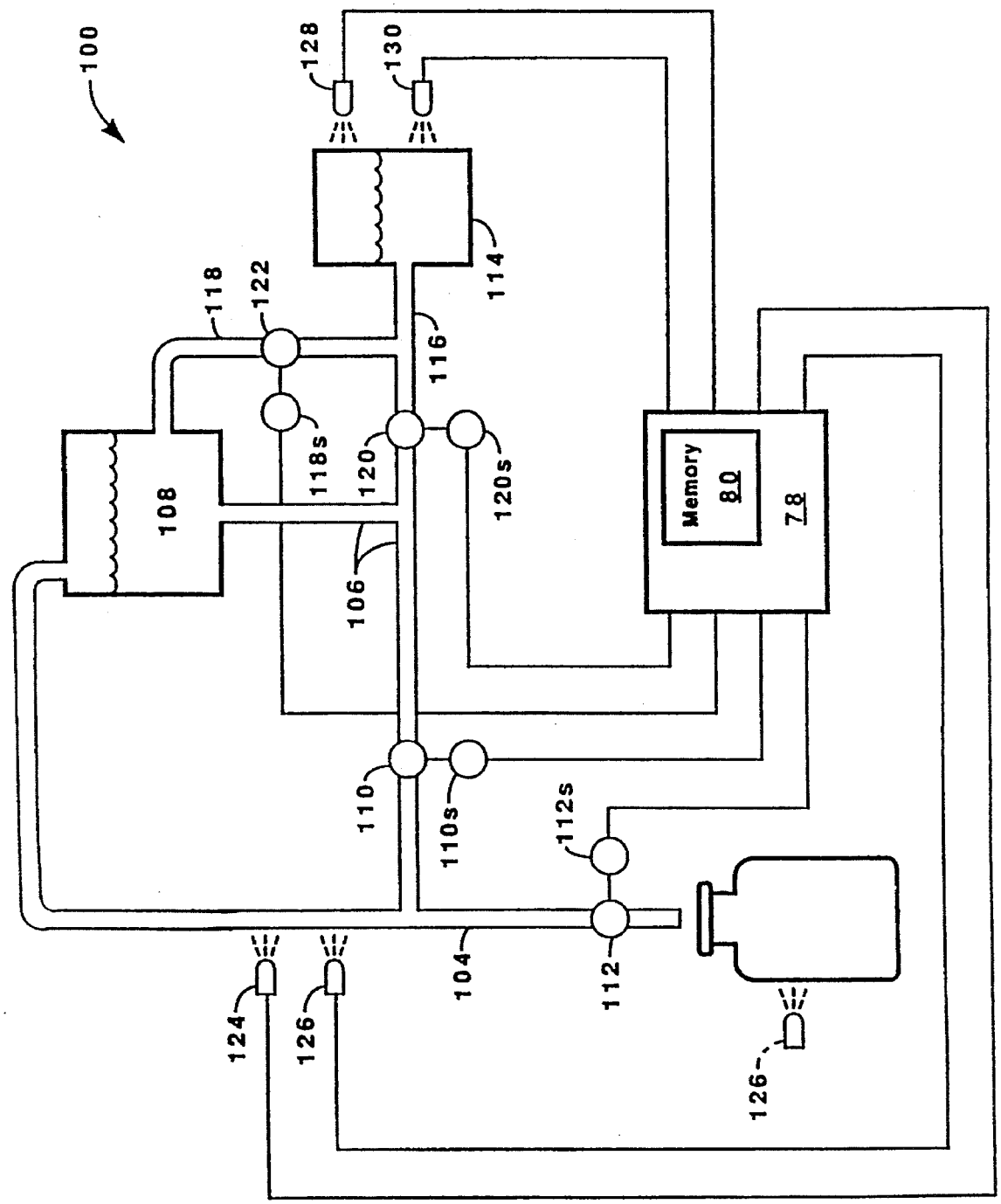
FIG. 3 is a schematic diagram illustrating a second embodiment of the fluid dispensing apparatus.

Referring now to FIG. 3, a second embodiment of the fluid dispensing apparatus indicated generally at 100 is shown. The dispensing apparatus 100 includes a fluid chamber 108 which is connected to a fill tube 104. The fill tube 104 is also connected to the fluid chamber 108 by a fluid supply line 106. The fill tube 104 and supply line 106 form a closed loop. The fluid supply line 106 includes a supply valve 110 which controls the flow of fluid between the fluid source 108 and the fill tube 104. A discharge valve 112 is disposed adjacent the discharge end of the fill tube 104. Valves 110 and 112 are connected to programmable controller 78 by solenoids 110s and 112s.

The fluid source 108 may also be connected to a fluid pump 114 for recirculating fluid within the source 108. Pump 114 is connected to the fluid supply line 106 by line 116. A second line 118 connects line 116 to the fluid source 108. Valves 120 and 122 are disposed respectively in lines 116 and 118. Valves 120 and 122 are connected to programmable controller 78 by solenoids 120s and 122s. By alternating the pressure within fluid pump 114 between a pressure greater than and less than the pressure in filling source 108, fluid can be transferred between the fluid source 108 and pump 114.

In the embodiment shown in FIG. 3, four level sensors 124, 126, 128 and 130 are used to provide input to a programmable controller 78 which controls the operation of the fluid dispensing device 100. Sensors 124 and 126 are disposed adjacent to the fill tube 104. Sensor 124 defines an upper level of fluid in the fill tube 104 while sensor 126 defines a lower level of fluid in the fill tube 104. The spacing of sensors 124 and 126 determines the fill volume. Sensors 128 and 130 define respectively the upper and lower fluid levels in fluid pump 114. Both sensors 128 and 130 should be above the level of the inlet to the pump 114.

The controller controls the operation of the valve 110, 112, 120 and 122 as well as the pressure of the pump 114 according to pre-programmed instructions. The operation of the fluid dispensing apparatus 100 is the same as the first embodiment. At the start of a dispensing cycle, supply valve 110 is opened and fluid flows from a pressurized source 108 through supply line 106 into the fill tube 104. When upper sensor 124 is satisfied (indicating that the fill tube 104 is filled), valve 110 closes and discharge valve 112 opens to dispense the fluid into a container. When the fluid level drops to the level of lower sensor 126, the discharge valve 112 closes and the cycle restarts.

Sensor 126, instead of being positioned in the fill tube 104, could be used to detect the level of liquid in the container. The mode of operation would remain essentially the same, except the discharge valve 112 would close when sensor 126 detects the rising fluid in the container. This mode of operation is particularly useful in situations where a uniform level in the fluid containers is desired and the actual fill volume is not critical. An infrared sensor 126 should preferably be used so that fluid levels in the container can be detected even where the container is opaque. Alternatively, the system can operate without sensors 124 and 126, except when sensor 126 is positioned at the bottle height.

Figure 4:
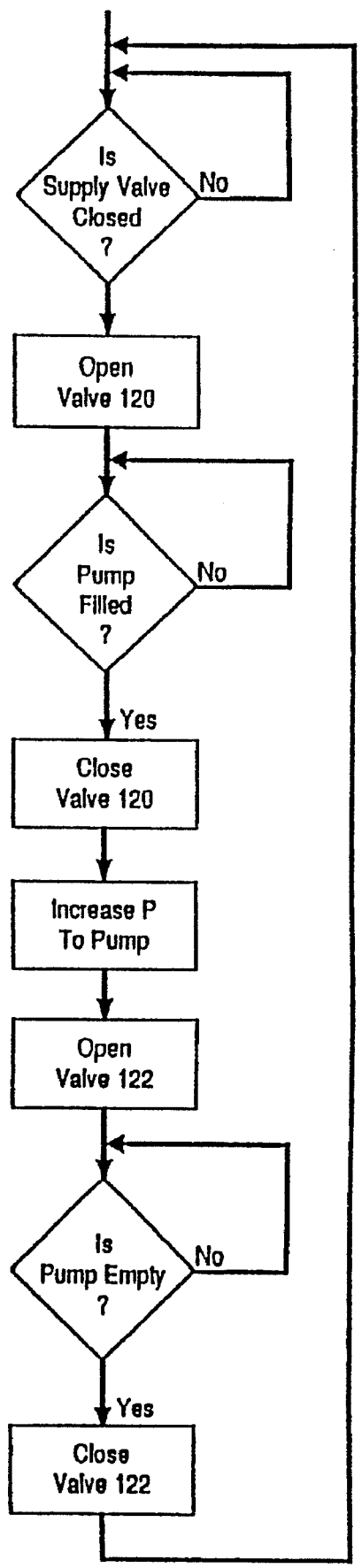
FIG. 4 is a flow diagram illustrating the mode of operation of the second embodiment of the fluid dispensing apparatus during the recycle stage.
Figure 2:
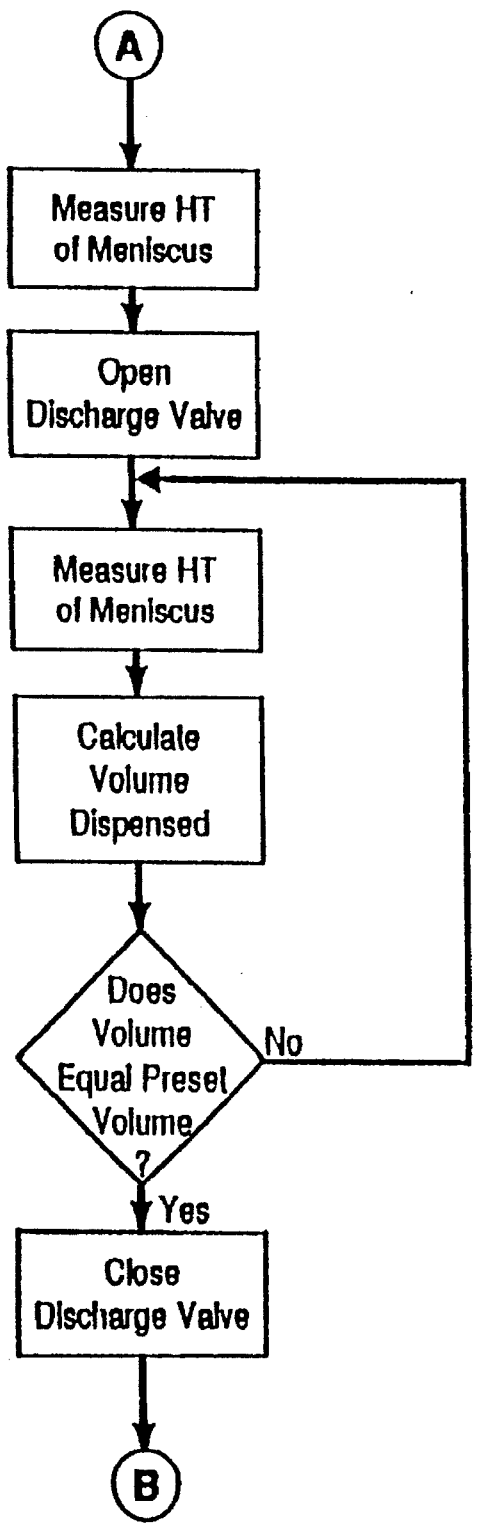
FIG. 2b is a flow diagram illustrating an alternate mode of operation of the fluid-dispensing apparatus during the dispense stage of the dispense cycle.
FIG. 2c is a flow diagram illustrating a second alternate mode of operation of the fluid-dispensing apparatus during the dispense stage of the disperse cycle.
Figure 2:
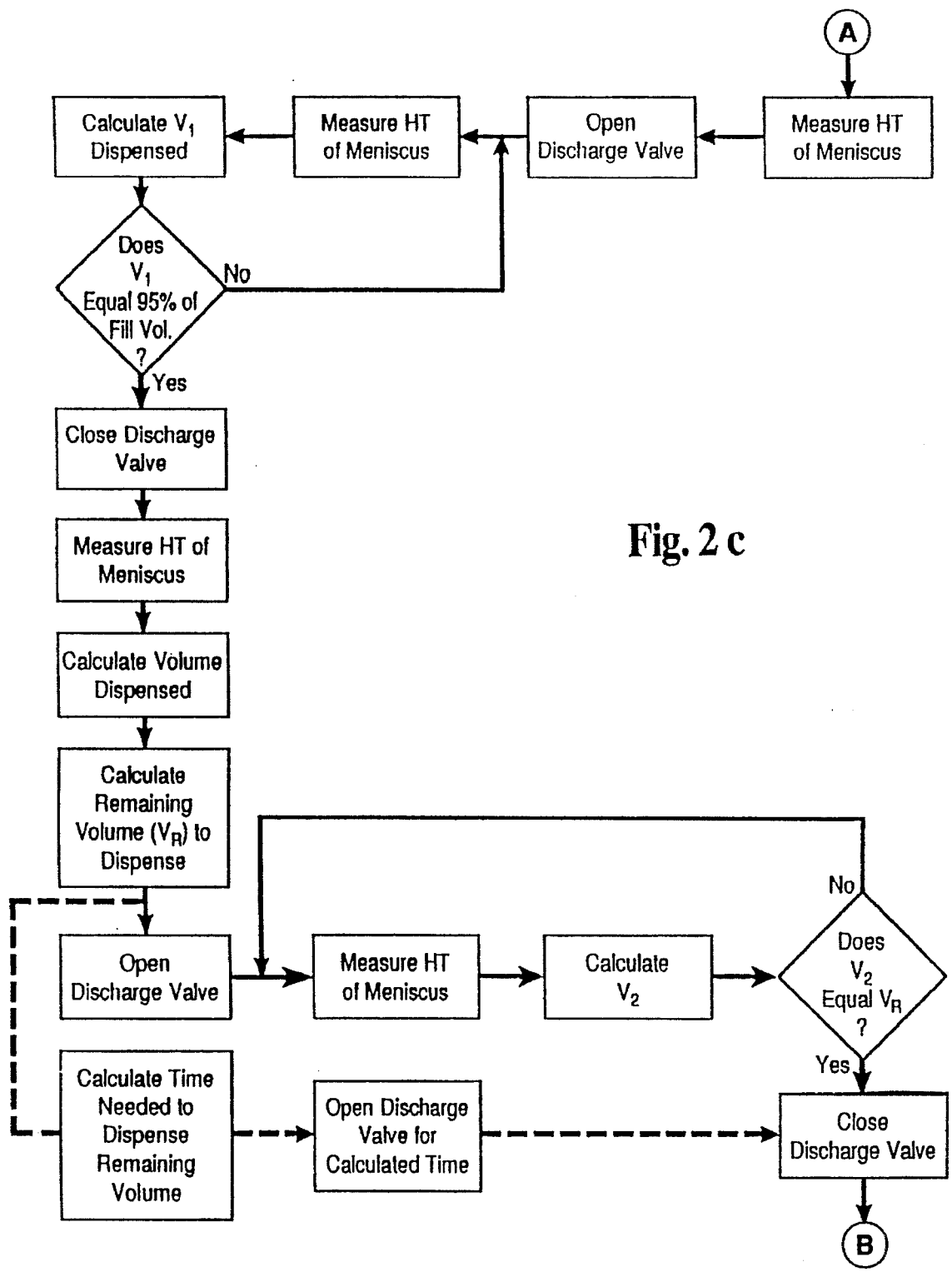

Suspensions can be effectively processed in the second embodiment by recirculating idle liquid in the fluid source 108 through pump 114 back to fluid source 108. Referring to FIG. 4, the pressure in pump 114 alternates between a pressure greater than and less than the pressure in the fluid source 108. To transfer liquid from the fluid source 108 to the pump 114, valve 110 is closed and valve 116 is opened. The pressure in the pump 114 must be lower than the pressure in the fluid source 108 so that the fluid flows from the fluid source 108 into the pump 114. When upper sensor 128 is satisfied, valve 120 closes and the pressure in fluid pump 114 is increased to a pressure greater than the pressure in the fluid source 108. Valve 122 is open causing the fluid to pass from pump 114 through line 118 into the fluid source 108. When lower sensor 130 sees the receding meniscus, valve 122 closes and the pressure in pump 114 decreases to a pressure less than the pressure in the filing source 108. At any time that valve 110 opens, valve 120 will remained closed.

From the foregoing description, it will be apparent that the fluid dispensing apparatus 10 provides an extremely accurate method for dispensing a predetermined volume of fluid. Further, by knowing the position of the meniscus before the dispensed stage begins, improvements in accuracy can be made by compensating for a smaller than normal meniscus. Also, the final position of the meniscus can be detected to provide a basis for rejecting out-of-range fill volumes on line as they occur.

The present invention overcomes the disadvantages associated with positive displacement pumps since there are no moving parts. Thus, the present invention virtually eliminates the possibility of particulate contamination. Further, the fluid dispensing apparatus can be cleaned and sterilized in place without disassembling the apparatus.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An apparatus for dispensing a predetermined volume of fluid comprising:

(a) a closed-fluid chamber containing the fluid to be dispensed;

(b) a fill tube communicatively connected to the fluid chamber and forming a closed loop with the fluid chamber;

(c) a fill valve disposed in the closed circuit formed by the fill tube for controlling the flow of fluid from the fluid chamber into the fill tube;

(d) sensing means for detecting the level of the fluid in the fill tube; and (e) a discharge valve for dispensing the contents of the fill tube; and (f) an electronic controller responsive to said sensing means for selectively opening and closing the fill valve and the discharge valve to first transfer fluid from the fluid chamber to the fill tube and then to dispense a predetermined volume of fluid from the fill tube.

2. The fluid dispensing apparatus of claim 1 further including a recycling reservoir connected to fluid chamber, and means for circulating fluid between the recycling reservoir and the fluid chamber.

3. The fluid dispensing apparatus of claim 2 wherein the recycling reservoir comprises a variable pressure pump.

4. The fluid dispensing apparatus of claim 3 wherein the circulating means includes first and second recirculating lines connecting the variable pressure pump with the fluid chamber; a first valve disposed in said first recirculating line; a second valve disposed in said second recirculating lines; and means for selectively opening and closing said valves as the pressure in said pump is varied to transfer fluid between the fluid supply and the pump.

5. The fluid dispensing apparatus of claim 1 wherein the sensing means comprises a first level sensor for detecting when the fill tube is filled to a predetermined level; and a second fluid level sensor for detecting when the fluid level in the fill tube drops to a second predetermined level which is lower than the first predetermined level, wherein the volume of the fill tube between said first and second level sensors determines the fill volume.

6. The fluid dispensing apparatus of claim 1 wherein the sensing means includes a meniscus sensor for continuously measuring the height of the meniscus in the fill tube as the fluid is dispensed; and wherein the controller is operative to continuously calculate the amount of fluid dispensed based on the measured height of the meniscus and to close the discharge valve when the calculated volume of the fluid dispensed equals the predetermined fill volume.

7. The fluid dispensing apparatus of claim 1 wherein the sensing means includes a meniscus sensor for measuring the height of the meniscus in the fill tube, wherein the controller is operative to calculate the volume of fluid dispensed based on the measured height of the meniscus before and after the fluid is dispensed to calculate a subsequent volume of fluid to be dispensed to equal a predetermined fill volume and to open the discharge valve to dispense the subsequent volume of fluid so that the total volume dispensed is equal to the desired fill volume.

8. The fluid dispensing apparatus of claim 7 wherein the controller is operative to open the discharge valve for a predetermined time period to dispense the subsequent volume of fluid.

\* \* \* \* \*